Nov. 14, 1939.    M. D. STONE    2,180,176
STRAIN GAUGE
Filed May 20, 1936    3 Sheets-Sheet 1
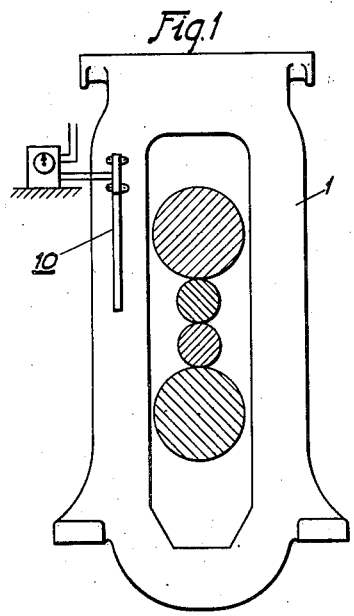
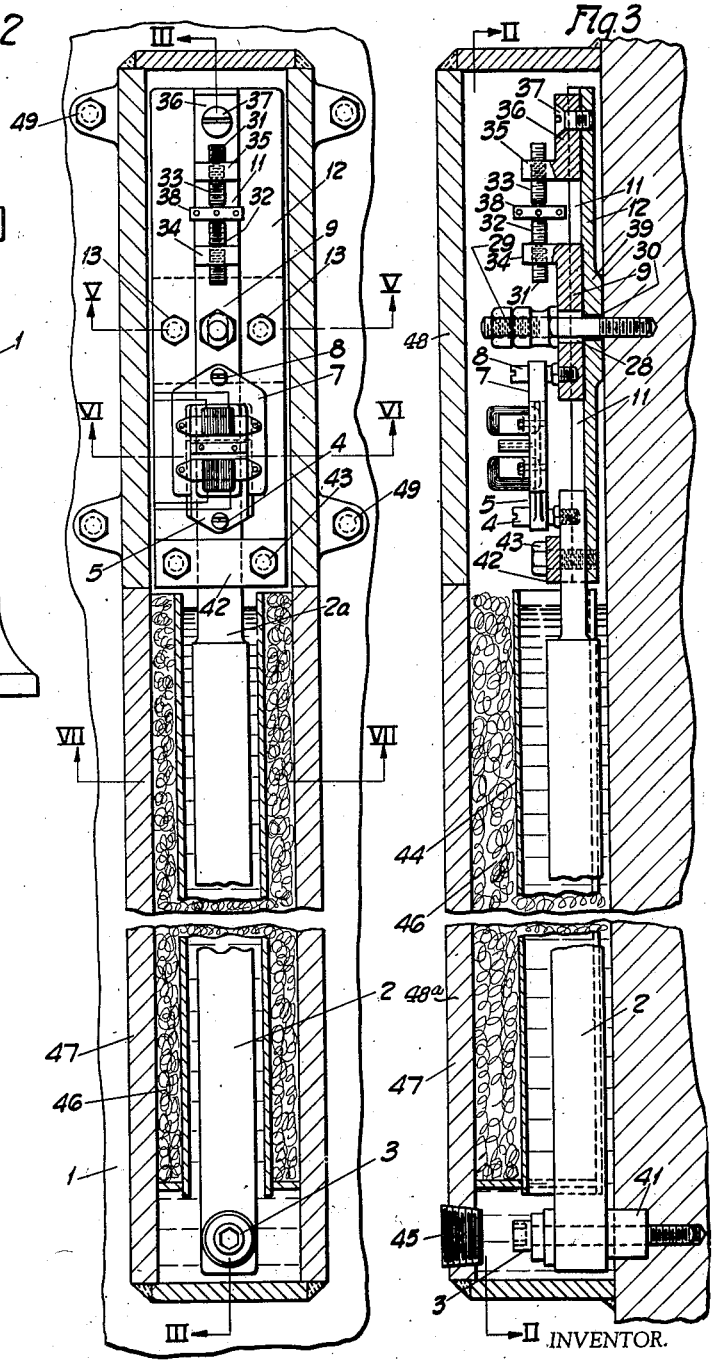
WITNESSES
John T. Flaherty
J. E. Dickinson
INVENTOR.
Morris D. Stone
BY Brown Critchlow & Flick
his ATTORNEYS.

Nov. 14, 1939.   M. D. STONE   2,180,176
STRAIN GAUGE
Filed May 20, 1936   3 Sheets-Sheet 2

WITNESSES
John T. Flaherty
J.E. Dieckmann

INVENTOR
Morris D. Stone
BY Brown, Critchlow &
Flick   ATTORNEYS

Nov. 14, 1939.   M. D. STONE   2,180,176
STRAIN GAUGE
Filed May 20, 1936   3 Sheets-Sheet 3
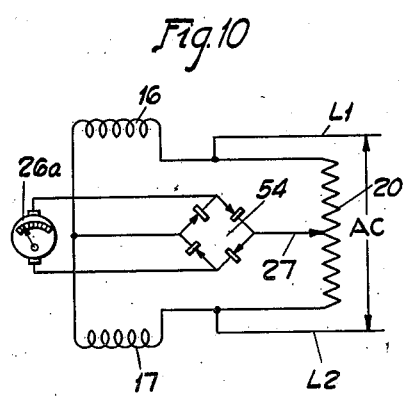
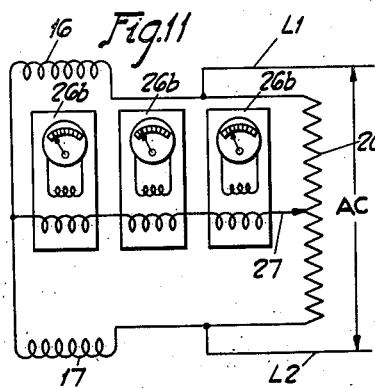
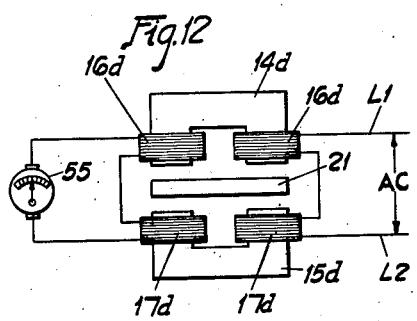
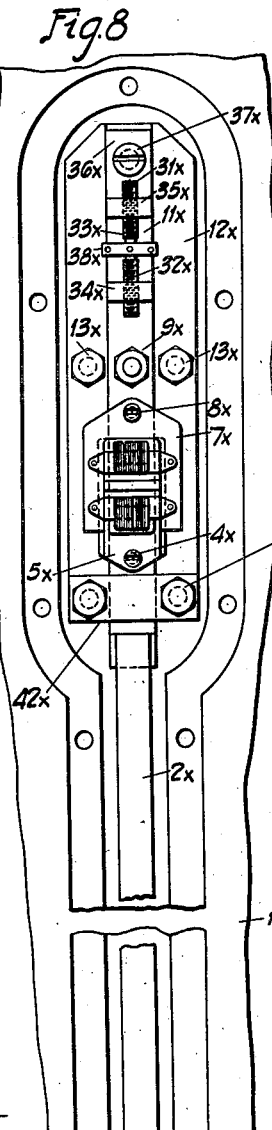
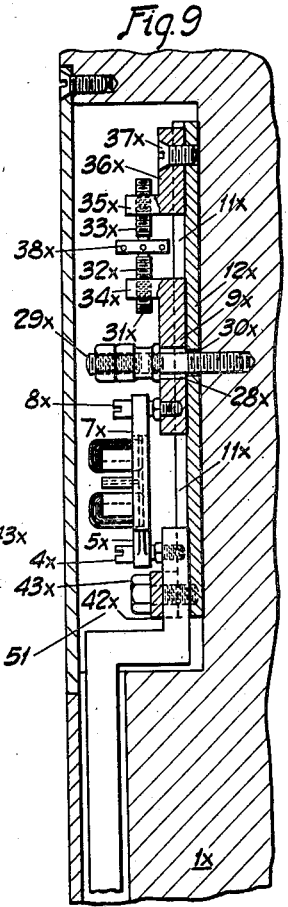
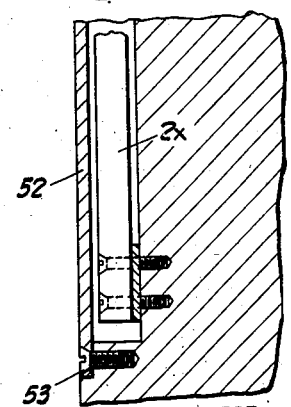
WITNESSES
INVENTOR.
Morris D. Stone
BY Brown, Critchlow & Flick
his ATTORNEYS Patented Nov. 14, 1939

2,180,176

UNITED STATES PATENT OFFICE 2,180,176

STRAIN GAUGE

Morris D. Stone, Pittsburgh, Pa., assignor to United Engineering & Foundry Company, Pittsburgh, Pa., a corporation of Pennsylvania Application May 20, 1936, Serial No. 80,917

3 Claims. (Cl. 265—1)

This invention relates to an apparatus for measuring the load strains which occur in machine frames and the like, and more particularly to an apparatus of this character which may be referred to as a strain gauge for measuring such strains by the distortions which they produce, and while not necessarily so limited it is especially adapted for use in determining by the stretch in the housing posts of a rolling mill the pressures between the rolls at all times.

An object of the invention is to provide a measuring device of this type which, in addition to being extremely sensitive and accurate, is also adapted to be readily installed in either a new or an old machine to be tested without requiring any changes in the otherwise required structure of the machine frame.

Another object is to provide an instrument which is especially adapted for use in measuring the strains in a rolling mill and which, besides being relatively simple and inexpensive to manufacture and install, is electrically adapted to permit its pressure-indicating or recording mechanism being located at a point which is remote with respect to the mill housing so that it may be conveniently placed for the inspection of the mill operator and at the same time be protected against the destructive vibrations of the mill.

A further object is to provide a device of this character which does not have to be removed or altered when the rolls of a mill are being changed.

A still further object is to provide for readily adjusting the instrument both at the time of its installation and afterwards.

Figure 6:
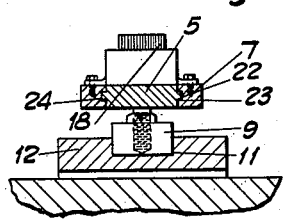
Figure 4:
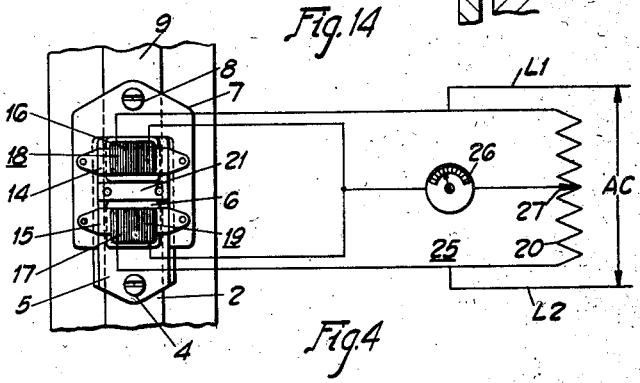
Figure 7:
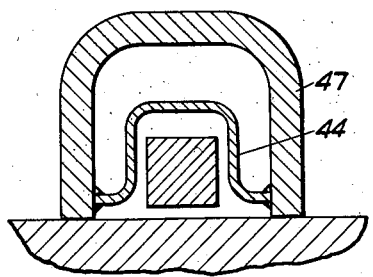
Figure 5:
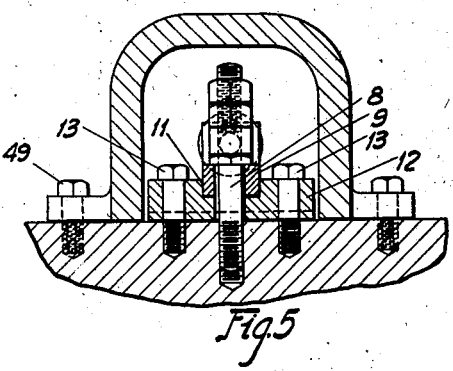

These and various other objects as well as the various other novel features and advantages of the invention will be apparent when the detailed description is read in conjunction with the accompanying drawings, of which Fig. 1 is an elevational view illustrating the manner in which a measuring instrument of the type contemplated by the invention is secured to a rolling mill housing; Fig. 2 a transverse sectional view of a recommended form of the invention being taken on the line II—II of Fig. 3; Fig. 3 a sectional view taken on the line III—III of Fig. 2; Fig. 4 a plan view on a somewhat enlarged scale of the electromagnetic strain-responsive gauge head assembly of the device and showing a circuit therefor including the strain-indicating instrument; Figs. 5, 6 and 7 sectional views, respectively, taken on the lines V—V, VI—VI and VII—VII of Fig. 2; Figs. 8 and 9 views similar to Figs. 2 and 3, respectively, of a modified form of the invention; Figs. 10, 11 and 12 modified schematic wiring diagrams of other electrical circuits which may be used with the recording instrument; and Figs. 13 and 14 also similar to Figs. 2 and 3 of another modification of the invention.

Referring to the drawings, and first more particularly to the embodiment of the invention illustrated in Figs. 1 to 7, the numeral 10 designates the general assembly thereof which as shown best in Fig. 1 is adapted more especially for use with a rolling mill being mounted on the housing post 1 thereof in a position to be responsive to the distortions caused by the pressure between the mill rolls. In detail this embodiment comprises a vertically disposed rod 2 which is attached to the housing 1 at its lower end by a screw bolt 3. Its upper end is extended along the housing wall and is free to move relative to the housing whenever the latter is distorted by the stock entering or leaving the rolls or when a load strain is otherwise exerted upon the housing. To prevent any lateral displacement it is reduced in section at its upper extremity and fitted for guided movement in the groove 11 of a channel-shaped bar 12 which is secured by means of screws 13 to the housing 1.

Between this channel bar 12 and the rod 2 there is secured an electromagnetic device or gauge head 6 for electrically indicating at a remote point the distortion of the housing occurring between the screw bolts 13 and 3 which is communicated to it by the rod 2 when the housing is loaded or relieved of a load. As illustrated, although it may take other equivalent forms as will presently appear, the head 6 comprises a main frame 7 which is secured by a screw 8 to a support 9 that is in turn adjustably mounted for guided movement like the upper end of the rod 2 in the groove 11 of the channel-shaped bar 12. Within this frame there is slidably arranged an armature support 5 which is secured by a screw 4 to the upper end of the rod 2.

With such an arrangement, as will be readily appreciated, the armature support 5 is moved whenever the distance between the screws 3 and 13 is changed by the stress in the housing and in an equal amount. To vary the extent of this armature movement the points of engagement of these screws may, of course, be increased or decreased by changing the length of the rod 2 although the rod is preferably made relatively long as indicated, and of a length which will provide a sufficient movement of the moving element in the measuring instruments to give the magnitude of readings desired.

Referring more particularly to Figs. 4, 5 and 6, the frame 7 is made of some suitable nonmagnetic material and has mounted upon it a pair of accurately spaced parallel transversely disposed pole pieces 14 and 15. Upon these there is in turn mounted a pair of suitable solenoids 16 and 17 which form therewith a pair of electromagnets 18 and 19. On the armature support 5, which is also made of magnetic material, there is mounted, for movement back and forth between the pole pieces 14 and 15, an accurately formed armature 21 which is adapted to modify the reactance of the circuits in which the solenoids 16 and 17 are connected in accordance therewith whenever its position relative to such pole pieces is changed. To insure the faces of this armature being always moved in planes parallel to the opposed faces of the pole pieces 14 and 15 the support 5 on which it is mounted is disposed for guided movement in a closely fitting slot 22 provided therefor in the frame 7, and to restrain it against lateral displacement tongues 23 are provided on its side edges to move in grooves 24 provided on the frame 7 for their reception.

As illustrated in Fig. 4, the solenoids 16 and 17 of the electromagnets 18 and 19 are connected in series circuit relation with each other and in parallel relation with a reactance or resistance 20 in a "Wheatstone bridge" circuit 25. A source of alternating current is provided for this circuit by a pair of line conductors $L_1$ and $L_2$, and connected thereto at the opposite ends of the resistor and solenoid branches of the circuit. Between the two solenoids 16 and 17 and the mid-section of the resistor there is connected a meter 26, in the nature of an ammeter, which is adapted to measure the flow of current across such branch of the circuit and hence the displacement of the armature 5 caused by the distortion of the housing. Accordingly, by calibrating this meter, as is done, in terms of the pressures causing the movement of the armature 21 it is adapted to measure the values of such pressures.

In order to provide for adjusting the ammeter circuit in a well-known manner, so as to provide a zero reading of the meter before a load or a change in load is imposed upon the mill housing, it is connected to the resistor 20 by a variable connection 27 which needs only to be changed to balance the circuit to obtain such a reading.

In order to provide for adjusting the armature 21 to a position midway between the pole pieces 14 and 15 when the apparatus is installed, which is desirable, the support 9 is secured to the bar 12 by a screw bolt 29 which is fitted in a slot 28 in the support and engaged in the housing by way of a hole 30 in the bar 12. For incrementally adjusting the support 9 when the bolt 29 is released an adjusting screw 31 is employed. This screw, as illustrated, is divided into two threaded parts 32 and 33 which engage in bosses 34 and 35, respectively, provided on the support 9 and an anchor 36 secured to the bar 12 by a screw 37. To give fine adjustment the threads on the two sections 32 and 33 of the screw 31 are cut in the same direction but with different pitch angles so that the support is moved only an amount equal to the difference in pitch of the two threaded sections each time the screw is rotated, and to facilitate the turning of the screw it is provided at its mid-section with a turning disc 38.

To facilitate the assembly of this embodiment on the housing of either an old or new mill as is contemplated, a spacing boss 39 is provided on the bar 12 opposite the screws 13 by which it is secured to the housing and a spacing block 41 between the rod 2 and the housing. The purpose of these is to prevent the rough surface of the housing, which is usually unfinished, from interfering with the operation of the mechanism and permit the attachment of the bar and rod with but a small amount of surface finishing.

Another and important feature of the invention is that the rod 2 is made of the same material as the housing so that it will change with the temperature the same as the housing, and is so mounted that the housing temperature will be effectively communicated to and retained by it. To accomplish the latter objective the rod is disposed close to the housing and immersed in an effective heat exchange bath of oil or the like which is placed in a shell 44 attached to the housing and extending around the rod from the bottom thereof to the top. For draining the bath when desired, a screw-plug enclosed orifice 45 is provided at the lower end of the shell, the oil being inserted at the top of the shell which is not enclosed. To further aid in such objective a packing of some suitable heat-insulating material 46 is placed between the shell 44 and a housing 47 in which the apparatus as a whole is encased. It will also be appreciated that compensating means not shown may be incorporated in the device to compensate for any difference in the coefficient of expansion in the mechanism above the rod 2 such, for example, as extending the shell 44 thereabove and so filling it as to accomplish this end. This portion of the apparatus, however, is so short as compared to the rod that such compensation in most installations may be dispensed with.

The housing 47 in this embodiment of the invention is divided into two sections 48 and 48a, the lower section being extended up to the top of the shell 44 and connected to the housing, and the upper section 48 being held in place by screw bolts 49 so that it can be removed to give access to the adjusting mechanism and hence adapt the device to be readily adjusted when it is placed on the mill or afterwards as may be desired.

While the invention may be satisfactorily constructed and applied to a mill as described hereinbefore, it may also be actually embedded in the housing as shown by the embodiment thereof illustrated in Figs. 8 and 9 wherein the parts similar to the previously described embodiment are designated by the same reference characters except that they have the letter $x$ attached to them. In accordance with this latter embodiment in place of an outer housing 47 a cavity 51 is provided in the housing post $1x$ for, in effect, embedding the distortion-responsive mechanism of the apparatus in the mill housing. As a matter of economy the lower portion of this cavity is made only sufficiently deep to receive the rod $2x$ and the upper only deep enough to readily accommodate the rest of the mechanism inside of the face of the housing. The back of this cavity is preferably machined and the bar $12x$ secured flush therewith while the upper end of the rod $2x$ is offset to move in the groove $11x$ and connect with armature support $5x$. With such a construction the rod $2x$ is arranged sufficiently intimate with the housing that the heat transfer bath may be dispensed with although it can be used, and only a cover plate 52 is employed to enclose the apparatus, which does not project beyond the face of the housing. A feature of this is that the apparatus is better protected and at the same time presents a better appearance.

Figure 13:
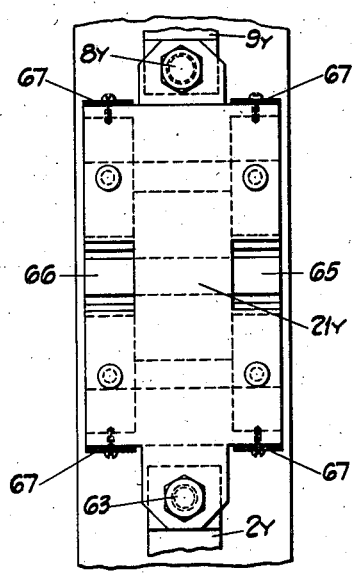
Figure 14:
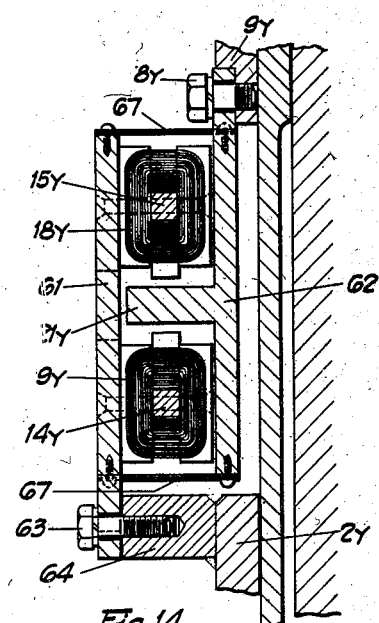

In the embodiment illustrated in Figs. 13 and 14, in which the analogous parts are distinguished by the suffix *y*, a gauge head is provided in which frictional contact between the members supporting the electromagnets and the interposed armature is eliminated. The advantage of this is that fouling of these parts is avoided and the effort required to effect relative movement between them is reduced to a minimum. As shown this head employs an upper supporting plate 61 and a lower supporting plate 62. The upper of these is rigidly secured by a bolt 63 to a spacing block 64 welded or otherwise firmly connected to the free end of the rod 2*y*, and the lower to the support 9*y* by the bolt 8*y*. The pole pieces 14*y* and 15*y* on which the electromagnets 18*y* and 19*y* are mounted are secured in spaced relation to the upper plate 61, and the armature 21*y* is secured to the lower plate 62 being disposed as before between the pole pieces 14*y* and 15*y*. In order to provide for measuring the air-gap spacing between the faces of the armature and the pole pieces, a pair of slots 65 and 66 are provided in the plate 61 opposite these gaps, and to assist in maintaining the plates 61 and 62 in parallelism, spaced struts 67 formed of thin metal are connected between their ends.

In place of the indicator circuit illustrated in Fig. 4, any one of those shown in Figs. 10, 11 and 12 may be employed. That of Fig. 10 differs from Fig. 4 only in that a rectifier 54 is placed in the bridge circuit and a direct current ammeter 26*a* is used in place of an alternating current meter, the direct current meter having the advantage that it gives a direct lineal dial displacement reading while the A. C. meter is displaced according to the square of the current. Fig. 11, on the other hand, contemplates the use of alternating current watt meter type of indicators which also give direct linear readings. In addition, this embodiment also contemplates a plurality of such meters being placed in different locations as well as one being in the nature of a permanent recording meter. Another modification is that shown in Fig. 12 wherein the pole pieces 14*d* and 15*d* are each equipped with two solenoids 16*d* and 17*d* which are disposed in transformer relation and have their primaries connected to the current supply L₁ and L₂ and their secondaries connected in series with a voltmeter 55 which will record the voltage changes produced in them by the shifting of the armature 21.

When installing the apparatus the mechanical structure is arranged on the inner or outer face of the housing posts in the direction in which the strains occur and preferably on one of the outer faces of both roll housings at the center thereof where the distortion produced is an average of that produced at the outer and window faces of the post. The indicating meters, which have not been described in detail as it is believed they are so well known as to need no such description, are positioned at any desired place away from the mill, such as on the operator's panel board where they can be conveniently observed and where they will not be affected by the mill vibration and hence permit the use of very sensitive instruments. Before using, the armature 21 is properly adjusted, as is the resistor connection 27, to provide a proper zero reading of the indicating meter, and while other methods may be used for calibrating the meter 26, one way is to place jacks or the like between the mill rolls and calibrate the meter 26 according to the measured load exerted on the rolls by the jacks. After this is done and the bridge circuit is energized the apparatus is ready for use.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. In a strain gauge comprising two relatively axially movable aligned parts, a mounting secured to one of said parts comprising a sliding element secured thereto and provided with an elongated slot, a bolt extended through said sliding element for securing it rigidly to a test element and disposed in said slot to permit axial adjustment of said sliding element, a guide element interposed between said sliding element and test element and held with respect to the test element by means of said bolt, an anchor member secured to said guide element, a projection on said slide element disposed opposite said anchor member, a screw having threaded engagement with said slide element projection and said anchor and means for turning said screw to adjust said slide element with respect to said test element.

2. In a gauge mounting according to claim 1, wherein the screw for adjusting said sliding element is provided with threads running in the same direction at both ends, but of different pitch to provide for finer adjustments of the slide.

3. In a gauge mounting according to claim 1, the guide element having an axial groove therein disposed to engage the sides of said slide element and define its path of movement.

MORRIS D. STONE.